Jan. 9, 1934.      C. L. BROWN      1,942,950
FLORAL RACK
Filed March 16, 1929
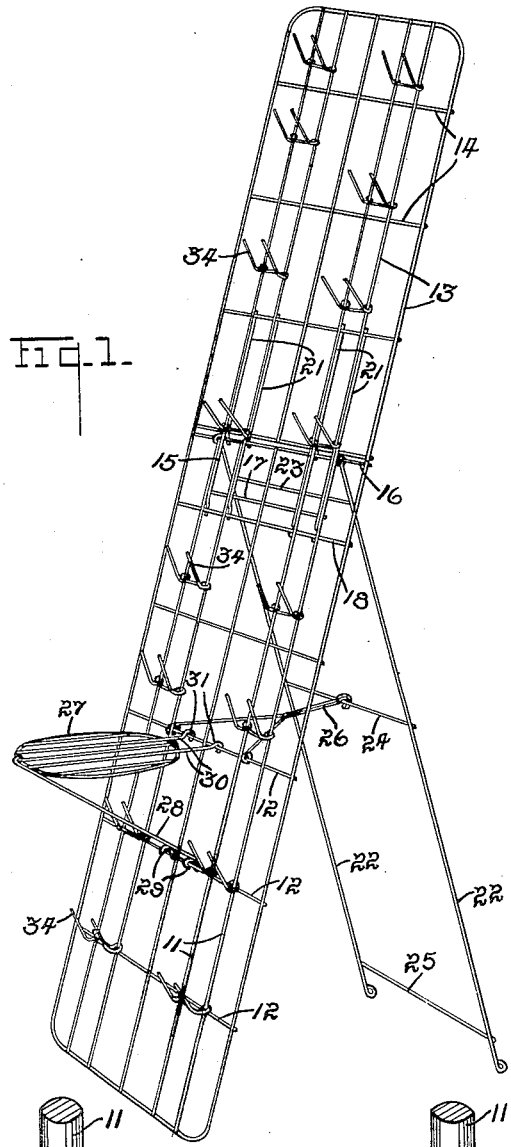
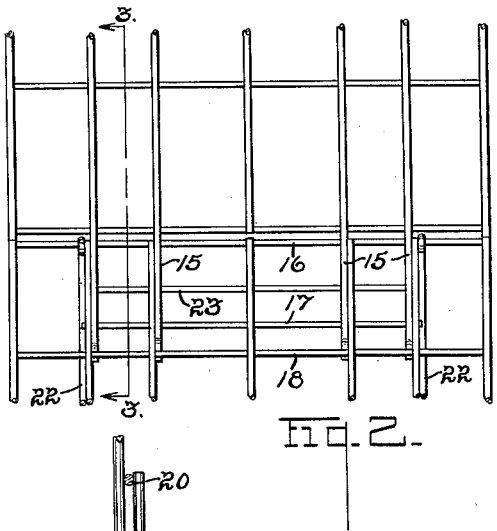
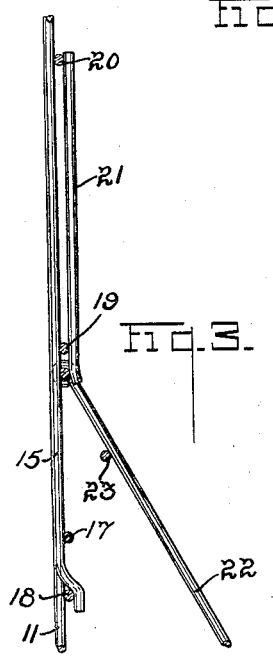
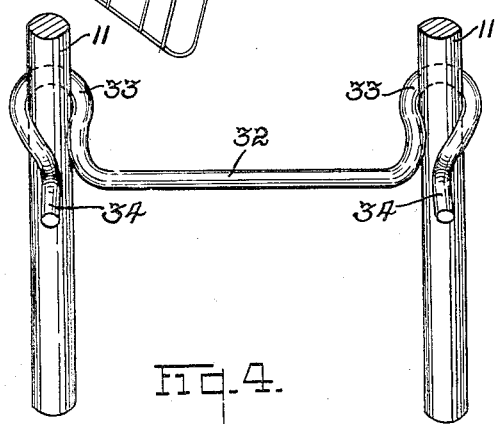
Inventor
Clarence L. Brown.
By Owen & Owen
Attorneys Patented Jan. 9, 1934

1,942,950

UNITED STATES PATENT OFFICE 1,942,950

FLORAL RACK

Clarence L. Brown, Hudson, Mich., assignor to Sawyer Manufacturing Company, Hudson, Mich., a corporation of Michigan Application March 16, 1929. Serial No. 347,701

10 Claims. (Cl. 211—161)

This invention relates to floral racks and has for its purpose to provide a rack which may be used for supporting wreaths and various floral designs, particularly in connection with funeral displays of flowers, and for any other similar purpose.

Another object of the invention is to provide a floral rack of the kind mentioned wherein holders for floral designs may be arranged quickly and adjustably to support any desired form of design.

Another object of the invention is to provide a detachable bracket which can be quickly and securely attached to any desired portion of the frame of the floral rack.

Another object of the invention is to provide a simple and efficient coupling by which a supplemental rack may be attached to a main rack. The objects and construction of the invention will appear more clearly as the description proceeds.

In the accompanying drawing forming a part of this specification, Figure 1 is a perspective view of one form of rack embodying this invention; Fig. 2 is an enlarged front view of the coupling between the main section and the supplemental section; Fig. 3 is a section on the line 3—3 of Fig. 2; Fig. 4 is an enlarged detail of one pair of supporting prongs. The rack shown comprises a main section and a supplemental section. The main section is formed of longitudinal wires 11 and cross wires 12, while the supplemental section comprises longitudinal wires 13 and cross wires 14. Several of the longitudinal wires 13 of the supplemental section are continued at one end 15. These extensions 15 are adapted to extend downward in front of the upper cross wire 16 of the main section and in front of a supplemental cross wire 17 on the main section below top wire 16 and a short distance above the next cross wire 18. The lower ends of extensions 15 are bent backward so as to extend back of wire 18, as clearly shown in Figure 3.

The lower cross wire 19 of the supplemental section and the next to the lower wire 20 have welded to the backs thereof short wires 21 parallel with certain of the wires 13. The lower ends of wires 21 are extended downward far enough to pass back of the upper wire 16 of the lower section when the extensions 15 are inserted back of wire 18.

It will be readily seen that in this way a coupling is formed which holds the extension rack firmly in position with respect to the main rack and at the same time allows the removal of the supplemental rack by simply a short upward movement thereof sufficient to free the lower ends of extensions 15 and wires 21. Wire 17 prevents the supplemental section from pivoting forward about wire 16.

To the upper wire 16 of the main section, there are pivoted bracing wires 22. These wires may be connected by an upper cross wire 23, a middle cross wire 24, and a bottom cross wire 25. A hook 26 is pivoted upon one of the middle cross wires 12 of the main section and is adapted to hook over wire 24 and hold brace wires 22 in proper angular relation to the main section so that they form braces and support the section in the position in which it is shown in the drawing.

A bracket member 27 is provided for attachment to the frame at any desired point. In the construction shown, this bracket is composed of a substantially circular wire and cross wires. To the front of this circle there are pivoted brace wires 28 which have at their free ends hooks 29 adapted to rest upon any desired cross wire 12 or 14. Two of the cross wires of bracket 27 are extended beyond the circular wire, as shown at 30, and terminate in hooks 31 which may be hooked over any desired cross wire 12 or 14. In this way, the bracket is securely held in any position in which it is placed upon the rack, while it is readily removable for packing purposes and also for changing its position to any desired place on the rack.

In order to support wreaths and other designs upon the rack, prong members are provided. In the construction shown, each of these prong members comprises a cross wire 32 formed with loops 33 at each end thereof and with the wires beyond the loops bent at an angle to the loops to form prongs 34. The loops 33 are preferably elongated slightly and bent around far enough so that the base of each prong 34 may rest against a vertical wire. It will be readily understood that these prong members may be bent into the shape described and have sufficient elasticity so that they can be readily placed upon the rack at any desired point by spreading the open end of the loop and forcing it over wire 11, the prong snapping back into the position in which it is shown in Figure 4 immediately after being placed upon the vertical wire.

The loop is bent at such an angle to the prongs that the prongs may be readily bent upward into position parallel with wires 11, and automatically fall to that position whenever the rack is placed horizontal. When the rack is stood up in the position in which it is shown in Figure 1, the prongs automatically fall outward to the position in which they are shown in that figure. It will be readily seen that when the prongs thus fall outward, the loops are cramped upon wires 11 and the friction thus created is sufficient to support the weight of the prong member. For this reason the prong members may be slid downward upon wires 11 until they rest upon a cross wire 12, as shown at the bottom of Figure 1, or they may be positioned at any higher point below the next cross wire, and will remain in whatever position they are placed until intentionally moved to another position.

The prong members may be applied to the extension rack, or to other forms of racks having similarly spaced vertical members in the same way that they are applied to the main rack.

It will be seen from the above description that a rack has been provided in which there is a simple and easily connected coupling between the main rack and the supplemental rack and one which firmly holds the two sections of the rack in desired relation to each other while in use and at the same time may be very quickly disconnected when desired. It will be further seen that a bracket is provided which may be quickly and securely positioned upon any desired position of the rack and as quickly removed when desired. It will be seen also that prongs have been provided which may be quickly applied to the rack in any desired number and at any desired point, and which may be moved vertically with respect to the rack to any desired height and will retain their position and hold any article placed thereon at the height to which they are adjusted, and at the same time may be positioned at a different height by merely sliding them up or down the wires. Furthermore, the prong members may be automatically retracted to lie parallel with the wires of the rack merely by positioning the rack horizontally. It will be understood that the prongs will remain in their adjusted position by the binding of loops 33 upon wires 11 or 13, and that increase of weight upon prongs 34 correspondingly increases the friction of the binding upon the wire so that they will maintain their position regardless of any normal weight which is placed thereon. At the same time, such a prong member may be removed from the rack merely by exerting greater than normal downward pressure upon prongs 34 and may be replaced upon any other desired portion of the rack by spreading the prongs apart and slipping the member onto the wires at the point desired.

While one form of rack has been described in detail, it will be understood that various changes may be made in the shape and sizes of the rack and other changes may be made within the scope of the appended claims.

What I claim is:

1. A floral rack comprising a wire normally slanting upward and a prong member comprising a partially closed loop embracing the wire and a prong extending from one end of the loop, the loop being normally open a distance less than the diameter of the wire and having sufficient spring to return it to normal form after the loop is sprung open and placed around or removed from the wire.

2. A floral rack comprising spaced parallel frame members and a prong member, said prong member comprising two loops loosely embracing two of said frame members, a portion connected to said loops and spacing them the same distance apart as said frame members, and prongs extending from said loops at an angle to the plane of said loops and in planes normal to said connecting portion, whereby the prongs may be moved in one direction into parallelism with the frame members and, when moved in the other direction, cramp the loops on the frame members.

3. A floral rack comprising spaced frame members and a prong member, said prong member comprising prongs, partially closed supporting loops, and connecting portions spacing the loops the same distance apart as the frame members, said loops being normally open a distance less than the cross section of the frame members and being of material having sufficient spring to return it to normal form after a loop is opened a distance equaling the cross section of the frame members.

4. A floral rack comprising substantially parallel frame wires and a prong member comprising loops embracing said wires, a connecting portion connecting the ends of said two loops nearest each other, and prongs projecting from the ends of said two loops most distant from each other.

5. A floral rack comprising two spaced frame members and a prong member, said prong member consisting of a wire the ends of which constitute prongs having free ends and bases, the bases resting against the respective frame members, and the intermediate portion of the wire comprising a connecting portion extending across the space between the prongs and to a point adjacent the base of each and loops extending around the frame members from the respective bases of the prongs to the respective ends of the connecting portion.

6. A prong member for a floral rack comprising two loops, a portion connecting corresponding ends of the loops and holding the two loops in substantially the same plane, and prong members extending from the other ends of said loops, each loop constituting more than a semi-circle and less than a full circle.

7. A prong member for a floral rack comprising two loops, a portion connecting corresponding ends of the loops and holding the two loops in substantially the same plane, and parallel prong members extending from the other ends of said loops at an angle to said plane.

8. A floral rack, comprising a main section having three approximately parallel frame members at one end, and a supplemental section having an end adapted to be placed in juxtaposition to said end of the main frame and having a member extending from its said end across one side of the first two of said frame members and across the other side of the third of said frame members, and having another member extending from its said end across the other side of the first of said frame members.

9. A floral rack comprising a lower section having three substantially parallel horizontal wires, one above the other, at its upper end, and a supplemental upper section having a plurality of wires extending downward from its lower end in front of the upper two of said wires of the lower section and behind the third of said three wires and having a plurality of wires extending downward from its lower end back of the upper end of the lower section.

10. A floral rack comprising a section having an end member and a cross member approximately parallel with said end member, and a second section extending from said end member of the first said section, the second said section having lugs extending across opposite sides of said end member and one of said lugs being extended and crossed to the opposite side of said cross member.

CLARENCE L. BROWN.